United States Patent
Yoshitomo et al.

(10) Patent No.: US 11,462,376 B2
(45) Date of Patent: Oct. 4, 2022

(54) VACUUM CIRCUIT BREAKER

(71) Applicant: Mitsubishi Electric Corporation, Tokyo (JP)

(72) Inventors: Yuji Yoshitomo, Tokyo (JP); Kazuki Sugino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/295,554

(22) PCT Filed: Jan. 31, 2019

(86) PCT No.: PCT/JP2019/003466
§ 371 (c)(1),
(2) Date: May 20, 2021

(87) PCT Pub. No.: WO2020/157933
PCT Pub. Date: Aug. 6, 2020

(65) Prior Publication Data
US 2022/0013313 A1 Jan. 13, 2022

(51) Int. Cl.
*H01H 33/53* (2006.01)
*H01H 33/666* (2006.01)
(Continued)

(52) U.S. Cl.
CPC ........ *H01H 33/6664* (2013.01); *H01H 33/53* (2013.01); *H02B 13/0354* (2013.01); *H02B 13/045* (2013.01)

(58) Field of Classification Search
CPC .. H01H 33/53; H01H 33/565; H01H 33/6664; H01H 33/6661; H01H 33/6662;
(Continued)

(56) References Cited

U.S. PATENT DOCUMENTS 7,511,243 B2 * 3/2009 Laskowski ........... H02B 13/035
  218/7
8,237,075 B2 * 8/2012 Isoya ................. H01H 33/6661
  218/118
(Continued)

FOREIGN PATENT DOCUMENTS

| JP | 2013058312 A | 3/2013 |
| WO | 2011104915 A1 | 9/2011 |
| WO | 2012063501 A1 | 5/2012 |

OTHER PUBLICATIONS

International Search Report (PCT/ISA/210) with translation and Written Opinion (PCT/ISA/237) dated May 7, 2019, by the Japan Patent Office as the International Searching Authority for International Application No. PCT/JP2019/003466.

*Primary Examiner* — William A Bolton
(74) *Attorney, Agent, or Firm* — Buchanan Ingersoll & Rooney PC

(57) ABSTRACT

A vacuum circuit breaker includes: a vacuum valve that is insulated and supported inside a grounded tank; a movable-side frame connecting a lower end of a movable-side external conductor to a movable conductor; a stationary-side frame connecting a lower end of a stationary-side external conductor to a stationary conductor; a movable-side insulating support tube that supports the movable-side frame and insulates thereof from the grounded tank; a stationary-side insulating support tube that supports the stationary-side frame and insulates thereof from the grounded tank; a movable-side flange covering a movable-side end of the grounded tank; and a rubber piece on an inner peripheral surface of the movable-side flange. The movable-side insulating support tube is supported, at an end opposite from an end connected to the movable-side frame, by the movable-side flange via the rubber piece and is movable along an axis and a radius of an arc-extinguishing chamber.

4 Claims, 5 Drawing Sheets

(51) Int. Cl.
*H02B 13/035* (2006.01)
*H02B 13/045* (2006.01)

(58) Field of Classification Search
CPC ......... H01H 33/143; H01H 2033/6665; H01H 2033/6667; H01H 9/02; H02B 13/0354; H02B 13/045; H02B 13/025; H02H 7/222
USPC ... 218/118, 134, 138, 139, 3, 10, 11, 13, 70, 218/140, 154
See application file for complete search history.

(56) References Cited

U.S. PATENT DOCUMENTS

| | | | |
|---|---|---|---|
| 8,723,070 B2 | 5/2014 | Yoshida et al. | |
| 8,748,770 B2* | 6/2014 | Nakayama | H02B 13/0354 218/78 |
| 8,895,884 B2* | 11/2014 | Yamamoto | H01H 33/42 218/7 |
| 9,136,674 B2* | 9/2015 | Ohtsuka | H02B 13/0354 |
| 9,208,978 B2* | 12/2015 | Yano | H01H 33/666 |
| 9,214,306 B2 | 12/2015 | Yoshida et al. | |
| 9,215,825 B2* | 12/2015 | Sano | H01H 33/666 |
| 9,431,800 B2* | 8/2016 | Yoshida | H02B 13/045 |
| 9,997,312 B2* | 6/2018 | Ozil | H01H 33/666 |
| 2014/0374383 A1* | 12/2014 | Shioiri | H01H 33/66207 218/139 |

* cited by examiner

VACUUM CIRCUIT BREAKER

FIELD

The present invention relates to a vacuum circuit breaker that includes an arc-extinguishing chamber using a vacuum valve.

BACKGROUND

As disclosed in Patent Literature 1, a vacuum circuit breaker includes an arc-extinguishing chamber. The arc-extinguishing chamber uses a vacuum valve, performs current interruption, and is housed in a grounded tank. The arc-extinguishing chamber is composed by connecting a plurality of components including: a movable-side insulating support tube; a movable-side frame; the vacuum valve; a stationary-side frame; and a stationary-side insulating support tube. Each end of the grounded tank is sealed with a flange, and the movable-side insulating support tube and the stationary-side insulating support tube are fixed to the flanges, respectively.

Dimensional variation of the arc-extinguishing chamber, which is an assemblage of the plurality of components, results from errors in manufacturing and assembly of the components. For this reason, a structure that absorbs a difference in length between the grounded tank and the arc-extinguishing chamber is necessary for the arc-extinguishing chamber to be disposed in the grounded tank. Accordingly, a slide contact structure is provided at a movable-side end of the vacuum valve to absorb the difference in length between the grounded tank and the arc-extinguishing chamber while ensuring electrical conductivity.

CITATION LIST

Patent Literature

Patent Literature 1: PCT International Publication No. 2012/063501

SUMMARY

Technical Problem

Since a clearance for a contact part of a slide contact is extremely narrow, a continued bending load proportional to mass and vibrational acceleration of the arc-extinguishing chamber is applied to the movable-side insulating support tube. The movable-side insulating support tube is fixed at an end to the movable-side flange, which seals the end of the grounded tank, so that the bending load applied to the movable-side insulating support tube causes a load on a juncture of the movable-side insulating support tube and the movable-side flange. The continued load on the juncture of the movable-side insulating support tube and the movable-side flange leads to fatigue at the juncture, thus problematically causing the arc-extinguishing chamber to have a decreased strength.

The present invention has been made in view of the above, and an object of the present invention is to obtain a vacuum circuit breaker that prevents decrease in strength of an arc-extinguishing chamber, which might be caused by a continued load on a juncture of a movable-side insulating support tube and a movable-side flange.

Solution to Problem

In order to solve the above problems and achieve the object, the present invention includes: a tubular grounded tank hermetically containing an insulating gas; a vacuum valve that is insulated and supported inside the grounded tank and includes a movable contact and a stationary contact; a movable conductor electrically connected to the movable contact; a stationary conductor electrically connected to the stationary contact; a movable-side external conductor and a stationary-side external conductor that are disposed respectively in a pair of bushings extending upward from the grounded tank; a movable-side frame electrically connecting a lower end of the movable-side external conductor to the movable conductor; a stationary-side frame electrically connecting a lower end of the stationary-side external conductor to the stationary conductor; and an insulating operation rod connected to an operating device that is disposed outside the grounded tank to operate the movable contact. The present invention also includes: a movable-side insulating support tube that supports the movable-side frame and insulates the movable-side frame from the grounded tank; a stationary-side insulating support tube that supports the stationary-side frame and insulates the stationary-side frame from the grounded tank; a movable-side flange that covers a movable-side end of the grounded tank and includes a hole allowing passage of the movable-side insulating support tube; and a flexible member on an inner peripheral surface of the movable-side flange. An arc-extinguishing chamber is formed by connection of the movable-side insulating support tube, the movable-side frame, the vacuum valve, the stationary-side frame, and the stationary-side insulating support tube, and is housed in the grounded tank. The movable-side insulating support tube is supported, at an end opposite from an end connected to the movable-side frame, by the movable-side flange via the flexible member and is movable along an axial direction and a radial direction of the arc-extinguishing chamber.

Advantageous Effect of Invention

A vacuum circuit breaker according to the present invention prevents decrease in strength of an arc-extinguishing chamber that might be caused by a continued load on a juncture of a movable-side insulating support tube and a movable-side flange.

DESCRIPTION OF EMBODIMENTS

With reference to the drawings, a detailed description is hereinafter provided of vacuum circuit breakers according to embodiments of the present invention. It is to be noted that these embodiments are not restrictive of the present invention.

First Embodiment

Figure 1:
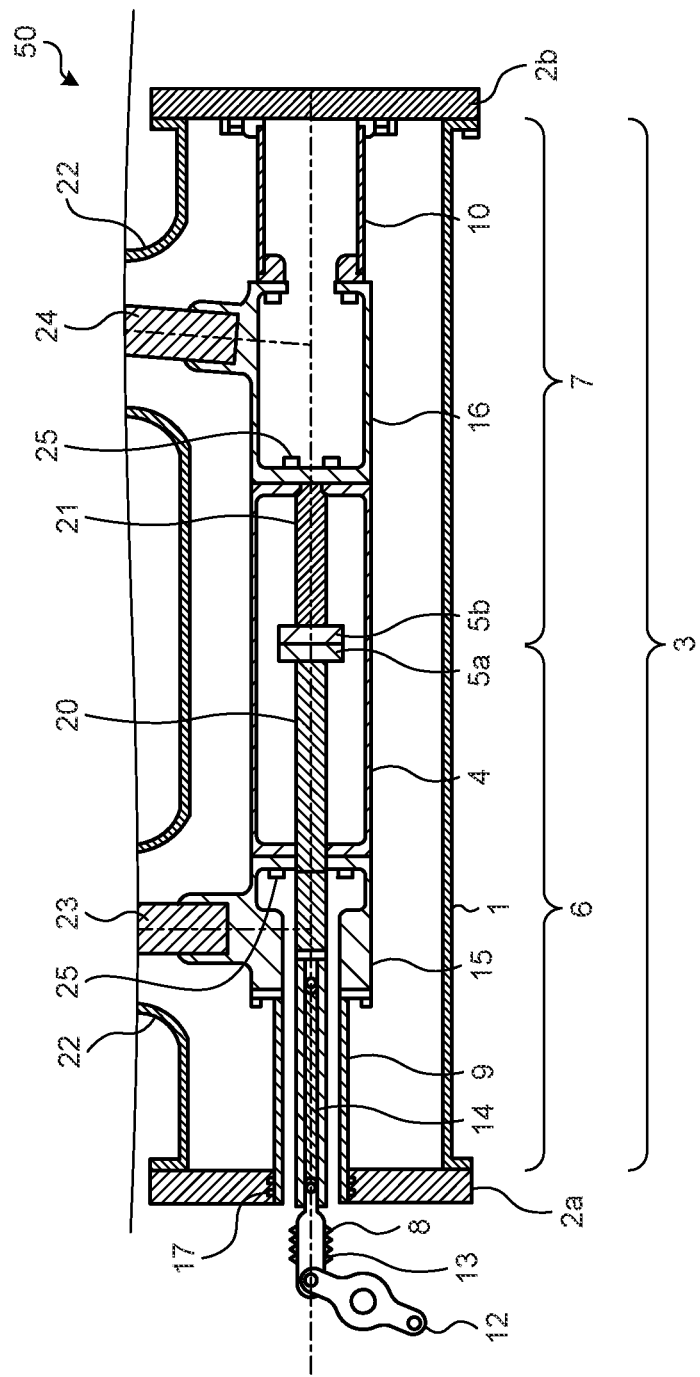
FIG. 1 illustrates structure of a vacuum circuit breaker according to a first embodiment of the present invention.

FIG. 1 illustrates structure of a vacuum circuit breaker according to the first embodiment of the present invention. As illustrated in FIG. 1, the vacuum circuit breaker 50 according to the first embodiment includes: a tubular grounded tank 1 hermetically containing an insulating gas; a vacuum valve 4 that is insulated and supported inside the grounded tank 1 and includes a movable contact 5a and a stationary contact 5b; a movable conductor 20 electrically connected to the movable contact 5a; a stationary conductor 21 electrically connected to the stationary contact 5b; and a movable-side external conductor 23 and a stationary-side external conductor 24 that are disposed in a pair of bushings 22 extending upward from the grounded tank 1. The vacuum circuit breaker 50 also includes: a movable-side frame 15 electrically connecting a lower end of the movable-side external conductor 23 to the movable conductor 20; a stationary-side frame 16 electrically connecting a lower end of the stationary-side external conductor 24 to the stationary conductor 21; an insulating operation rod 14 connected to an operating device 12 disposed outside the grounded tank 1 to operate the movable contact 5a; a movable-side insulating support tube 9 that supports the movable-side frame 15 and insulates the movable-side frame 15 from the grounded tank 1; and a stationary-side insulating support tube 10 that supports the stationary-side frame 16 and insulates the stationary-side frame 16 from the grounded tank 1. A movable-side end of the grounded tank 1 is covered by a movable-side flange 2a that includes a hole allowing passage of the movable-side insulating support tube 9. A stationary-side end of the grounded tank 1 is covered by a stationary-side flange 2b. Rubber pieces 17 are disposed as flexible members on an inner peripheral surface of the movable-side flange 2a. An arc-extinguishing chamber 3 is formed by connection of: the movable-side insulating support tube 9; the movable-side frame 15; the vacuum valve 4; the stationary-side frame 16; and the stationary-side insulating support tube 10, and is housed in the grounded tank 1. The vacuum valve 4 is fixed to the movable-side frame 15 and the stationary-side frame 16 with bolts 25.

The movable contact 5a is configured to receive driving force from the operating device 12 via a link mechanism 13, the insulating operation rod 14, and the movable conductor 20. The movable contact 5a can take a supply position to touch the stationary contact 5b and an interruption position to separate from the stationary contact 5b. During closing operation, a contact pressure spring 8 applies, to the insulating operation rod 14, force that pushes the movable contact 5a toward the stationary contact 5b. Therefore, electrical conductivity is ensured in a state the movable contact 5a and the stationary contact 5b are closed.

Figure 2:
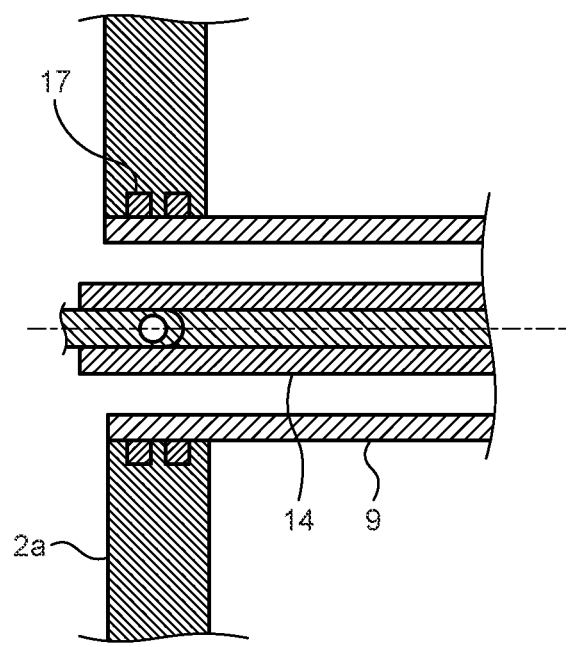
FIG. 2 is an enlarged view of a movable-side flange of the vacuum circuit breaker according to the first embodiment.
Figure 3:
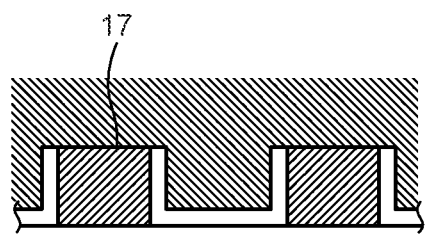
FIG. 3 is an enlarged view of flexible members disposed on the movable-side flange of the vacuum circuit breaker according to the first embodiment.

FIG. 2 is an enlarged view of the movable-side flange of the vacuum circuit breaker according to the first embodiment. The movable-side insulating support tube 9 is slidably inserted into the hole of the movable-side flange 2a. The movable-side insulating support tube 9 is supported by the movable-side flange 2a via the rubber pieces 17. FIG. 3 is an enlarged view of the flexible members disposed on the movable-side flange of the vacuum circuit breaker according to the first embodiment. Each of rubber pieces 17 disposed on the inner peripheral surface of the movable-side flange 2a is quadrangular in cross-section. It is to be noted that rubber piece 17 may be of circular or elliptical in cross-section.

The stationary-side insulating support tube 10 is fixed to the stationary-side flange 2b.

Figure 4:
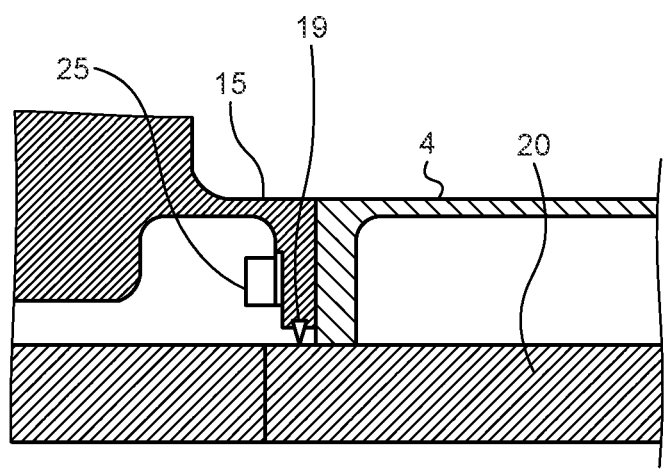
FIG. 4 is an enlarged view of a juncture of a movable-side frame and a vacuum valve in the vacuum circuit breaker according to the first embodiment.

FIG. 4 is an enlarged view of a juncture of the movable-side frame and the vacuum valve in the vacuum circuit breaker according to the first embodiment. The movable-side frame 15 is provided with a slide contact 19. The slide contact 19 is in contact with the movable conductor 20.

The movable-side insulating support tube 9 and the stationary-side insulating support tube 10 may be epoxy cast insulators or fiber-reinforced plastics made of organic or glass fibers impregnated with a resin.

Figure 5:
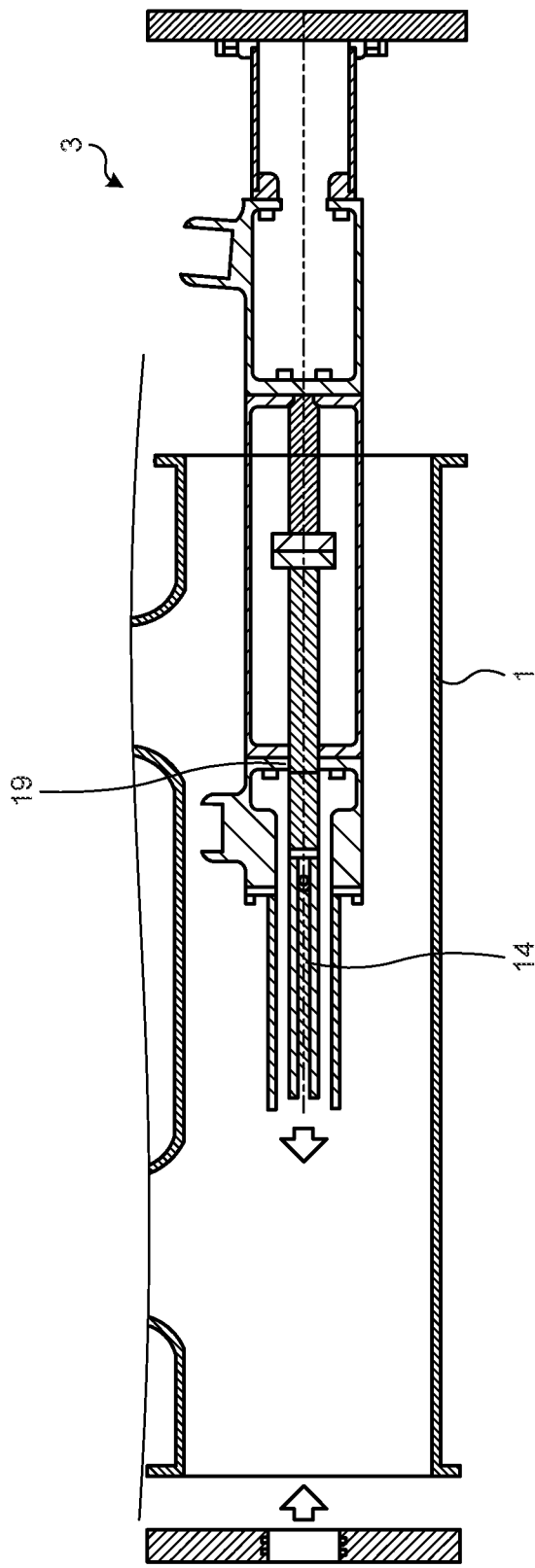
FIG. 5 illustrates a state an arc-extinguishing chamber is being arranged in a grounded tank of the vacuum circuit breaker according to the first embodiment.

FIG. 5 illustrates a state the arc-extinguishing chamber is being installed in the grounded tank of the vacuum circuit breaker according to the first embodiment. The vacuum circuit breaker 50 according to the first embodiment enables the arc-extinguishing chamber 3 to be assembled outside the grounded tank 1 and then inserted into the grounded tank 1. Therefore, the vacuum circuit breaker 50 according to the first embodiment is easy to manufacture, not requiring work that causes the insulating operation rod 14 to pass through the slide contact 19 inside the grounded tank 1.

The vacuum circuit breaker 50 according to the first embodiment has a slide structure for the movable-side insulating support tube 9, which is supported by the inner peripheral surface of the movable-side flange 2a, and has the flexible rubber pieces 17 disposed between the movable-side insulating support tube 9 and the movable-side flange 2a. The movable-side insulating support tube 9, which is a part of the arc-extinguishing chamber 3, is supported by the movable-side flange 2a via the rubber pieces 17 to be movable along both in an axial direction and in a radial direction of the arc-extinguishing chamber 3. Therefore, a bending load and a tensile load are less likely to be applied to the movable-side insulating support tube 9. Accordingly, it becomes possible to make the movable-side insulating support tube 9 to have a reduced wall thickness and a smaller outside diameter.

Since the movable-side insulating support tube 9, which serves as the part of the arc-extinguishing chamber 3, is axially movable, the vacuum circuit breaker 50 according to the first embodiment is capable of absorbing a difference in length between the grounded tank 1 and the arc-extinguishing chamber 3.

Since the vacuum valve 4 is connected at both ends to the movable-side frame 15 and the stationary-side frame 16 with the bolts 25, even when the vacuum circuit breaker 50 according to the first embodiment has vibration during opening and closing operation, a movable side of arc-extinguishing chamber 6 and a stationary side of arc-extinguishing chamber 7 have the same vibration. This suppresses abrasion at the slide contact 19 and temperature rise at a contact part of the slide contact 19.

Figure 6:
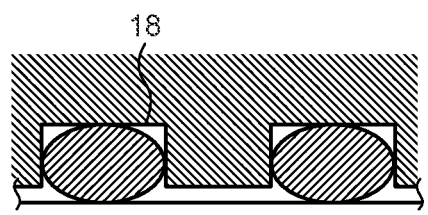
FIG. 6 illustrates cross-sectional shapes of flexible member variations disposed on the movable-side flange of the vacuum circuit breaker according to the first embodiment.

FIG. 6 illustrates cross-sectional shapes of flexible member variations disposed on the movable-side flange of the vacuum circuit breaker according to the first embodiment. Disposing the O-rings 18 of circular cross-section on the inner peripheral surface of the movable-side flange 2a, with the inner peripheral surface of the movable-side flange 2a partly machined, enables a difference to be caused between an internal air pressure of the movable-side frame 15 and the movable-side insulating support tube 9 and an internal air pressure of the grounded tank 1.

Since the movable-side insulating support tube 9 of the vacuum circuit breaker 50 according to the first embodiment is supported by the movable-side flange 2a to be axially movable, even when the movable contact 5a is subject to a continued push in a closed state, no load is applied to a part where the movable-side flange 2a supports the movable-side insulating support tube 9 via the rubber pieces 17. The movable-side insulating support tube 9 is therefore not required to have a larger diameter by having an increased wall thickness for the purpose of having mechanical strength to withstand a continued load, and the vacuum circuit breaker 50 is enabled to be smaller in size and lighter in weight. Since the movable-side insulating support tube 9 supported by the movable-side flange 2a via the rubber pieces 17 is also radially movable, the arc-extinguishing chamber 3 is prevented from decreasing in strength due to the bending load that is proportional to mass and vibrational acceleration of the arc-extinguishing chamber 3.

Second Embodiment

Figure 7:
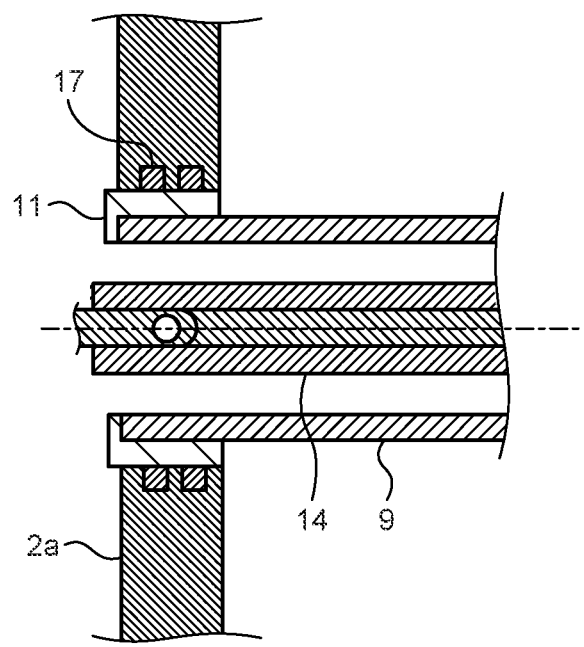
FIG. 7 is an enlarged view of a movable-side flange of a vacuum circuit breaker according to a second embodiment of the present invention.

FIG. 7 is an enlarged view of the movable-side flange of the vacuum circuit breaker according to the second embodiment of the present invention. The vacuum circuit breaker 50 according to the second embodiment is such that the movable-side insulating support tube 9 has, at an end opposite from an end connected to the movable-side frame 15, a metal ring 11 fixed to its outer periphery. The metal ring 11 abuts against the inner peripheral surface of the movable-side flange 2a via the rubber pieces 17. Thus the movable-side insulating support tube 9 is axially and radially movable and is not easily subject to a tensile load and a bending load. By installing the metal ring 11, deformation of the movable-side insulating support tube 9 can be suppressed and wall thickness of the movable-side insulating support tube 9 can be further reduced.

Disposing the O-rings 18 on the inner peripheral surface of the movable-side flange 2a as in the vacuum circuit breaker 50 according to the first embodiment, with the inner peripheral surface of the movable-side flange 2a partly machined, enables a difference to be caused between an internal air pressure of the movable-side frame 15 and the movable-side insulating support tube 9 and an internal air pressure of the grounded tank 1.

The above structures illustrated in the embodiments are illustrative of contents of the present invention, can be combined with other techniques that are publicly known and can be partly omitted or changed without departing from the gist of the present invention.

REFERENCE SIGNS LIST 1 grounded tank; 2a movable-side flange; 2b stationary-side flange; 3 arc-extinguishing chamber; 4 vacuum valve; 5a movable contact; 5b stationary contact; movable side of arc-extinguishing chamber; 7 stationary side of arc-extinguishing chamber; 8 contact pressure spring; 9 movable-side insulating support tube; 10 stationary-side insulating support tube; 11 metal ring; 12 operating device; 13 link mechanism; 14 insulating operation rod; 15 movable-side frame; 16 stationary-side frame; 17 rubber piece; 18 O-ring; 19 slide contact; 20 movable conductor; 21 stationary conductor; 22 bushing; movable-side external conductor; 24 stationary-side external conductor; 25 bolt; 50 vacuum circuit breaker.

The invention claimed is:

1. A vacuum circuit breaker comprising:
    a grounded tank hermetically containing an insulating gas, the grounded tank being tubular;
    a vacuum valve insulated and supported inside the grounded tank, the vacuum valve including a movable contact and a stationary contact;
    a movable conductor electrically connected to the movable contact;
    a stationary conductor electrically connected to the stationary contact;
    a movable-side external conductor and a stationary-side external conductor disposed in a pair of bushings extending upward from the grounded tank;
    a movable-side frame electrically connecting a lower end of the movable-side external conductor to the movable conductor;
    a stationary-side frame electrically connecting a lower end of the stationary-side external conductor to the stationary conductor;
    an insulating operation rod connected to an operating device disposed outside the grounded tank to operate the movable contact;
    a movable-side insulating support tube to support the movable-side frame and insulates thereof from the grounded tank;
    a stationary-side insulating support tube to support the stationary-side frame and insulates thereof frame from the grounded tank;
    a movable-side flange covering a movable-side end of the grounded tank, the movable-side flange including a hole allowing passage of the movable-side insulating support tube; and
    a flexible member on an inner peripheral surface of the movable-side flange, wherein
    an arc-extinguishing chamber is formed by connecting:
        the movable-side insulating support tube;
        the movable-side frame;
        the vacuum valve;
        the stationary-side frame; and
        the stationary-side insulating support tube, and the arc-extinguishing chamber is housed in the grounded tank, and
    the movable-side insulating support tube is supported, at an end opposite from an end connected to the movable-side frame, by the movable-side flange via the flexible member and is movable along an axial direction and a radial direction of the arc-extinguishing chamber.

2. The vacuum circuit breaker according to claim 1, wherein the movable-side frame, the vacuum valve, and the stationary-side frame are connected by bolts.

3. The vacuum circuit breaker according to claim 1, wherein the movable-side insulating support tube has, at the end opposite from the end connected to the movable-side frame, a metal ring fixed to an outer periphery thereof.

4. The vacuum circuit breaker according to claim 1, wherein the flexible member is an O-ring.

* * * * *